(12) United States Patent
Ciudad et al.

(10) Patent No.: US 7,839,434 B2
(45) Date of Patent: Nov. 23, 2010

(54) VIDEO COMMUNICATION SYSTEMS AND METHODS

(75) Inventors: Jean-Pierre Ciudad, San Francisco, CA (US); Michael Stochosky, San Francisco, CA (US); Scott Forstall, Mountain View, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 11/537,217

(22) Filed: Sep. 29, 2006

(65) Prior Publication Data

US 2008/0030590 A1 Feb. 7, 2008

Related U.S. Application Data

(60) Provisional application No. 60/821,509, filed on Aug. 4, 2006.

(51) Int. Cl.
*H04N 5/232* (2006.01)
*H04N 7/14* (2006.01)

(52) U.S. Cl. .............................. 348/211.12; 348/14.08

(58) Field of Classification Search .............. 348/211.2, 348/211.3, 211.12, 231.1, 14.01–14.08; 345/420, 345/619, 629; 386/46, 52, 53
See application file for complete search history.

(56) References Cited

U.S. PATENT DOCUMENTS

| | | | |
|---|---|---|---|
| 5,854,893 A | 12/1998 | Ludwig et al. | |
| 6,237,025 B1 | 5/2001 | Ludwig et al. | |
| 6,351,762 B1 | 2/2002 | Ludwig et al. | |
| 6,583,806 B2 | 6/2003 | Ludwig et al. | |
| 6,594,688 B2 | 7/2003 | Ludwig et al. | |
| 6,763,175 B1 * | 7/2004 | Trottier et al. | 386/52 |
| 6,961,446 B2 * | 11/2005 | Imagawa et al. | 382/103 |
| 7,102,643 B2 * | 9/2006 | Moore et al. | 345/473 |
| 7,152,093 B2 | 12/2006 | Ludwig et al. | |
| 7,206,809 B2 | 4/2007 | Ludwig et al. | |
| 7,230,639 B2 * | 6/2007 | Ferren et al. | 348/14.08 |
| 7,421,470 B2 | 9/2008 | Ludwig et al. | |
| 7,428,000 B2 * | 9/2008 | Cutler et al. | 348/14.11 |
| 7,433,921 B2 | 10/2008 | Ludwig et al. | |
| 7,457,483 B2 * | 11/2008 | Tokiwa | 382/298 |
| 7,477,282 B2 * | 1/2009 | Firestone et al. | 348/14.09 |
| 7,515,174 B1 * | 4/2009 | Francisco et al. | 348/14.16 |
| 7,589,863 B2 * | 9/2009 | Kita | 358/1.9 |
| 2003/0103136 A1 * | 6/2003 | Stanton | 348/49 |
| 2004/0041902 A1 * | 3/2004 | Washington | 348/14.08 |
| 2006/0092269 A1 * | 5/2006 | Baird et al. | 348/14.08 |
| 2006/0195786 A1 * | 8/2006 | Stoen et al. | 715/700 |
| 2006/0282867 A1 * | 12/2006 | Mizuhashi et al. | 725/105 |

OTHER PUBLICATIONS

"iChat AV Beta." iChat AV Beta: Reviews—Software—Internet—ZDNet Australia [online]. Jul. 21, 2003 [retrieved on Jan. 7, 2009]. Retrieved from Internet electronic mail: <http://www.zdnet.com.au/reviews/software/internet/soa/iChat-AV-Beta/0,139023437,12027...>.

* cited by examiner

*Primary Examiner*—Lin Ye
*Assistant Examiner*—Trung Diep
(74) *Attorney, Agent, or Firm*—Fish & Richardson P.C.

(57) ABSTRACT

Video data of a videoconference participant is generated and filtered versions of the video data are simultaneously displayed. One of the filtered versions is selected and transmitted to other videoconference participants.

23 Claims, 8 Drawing Sheets

VIDEO COMMUNICATION SYSTEMS AND METHODS

This application claims the benefit of U.S. patent application Ser. No. 60/821,509, filed one Aug. 4, 2006, entitled "Video Communication Systems and Methods," the disclosure of which is incorporated herein by reference.

BACKGROUND

This patent document relates to conferencing systems and methods.

Videoconferencing systems facilitate both audio and video communication among participants over a network. A conventional video conferencing system includes a near end and far end components. In a conventional videoconferencing system, image data associated with a near end user is captured by a near end video camera or other capture device. The near end captured image data is transmitted to a far end receiver and displayed to a far end user. Similarly, the near end image data can be displayed on a local system (e.g., displayed on a near end display component) along with far end image data that has been captured by the far end system components.

SUMMARY

Disclosed herein are systems and methods for applying effects a stream in a conference. In one implementation, the methods and systems are applicable for applying visual effects to a video stream in a videoconference. Alternatively, audio effects can be applied in an audio conference. In another implementation, one or both of audio and video effects can be applied to a stream in a videoconference.

In one videoconferencing example, a video input stream of a participant environment for a videoconference is received and filtered by a plurality of filters. The filtered versions of the video stream are displayed to a user, such as a videoconference participant, for selection. A selected filtered version of the video stream is transmitted to other videoconference participants.

In another implementation, a videoconferencing system includes a video camera, a display device, and a video processing device. The video camera is configured to generate first video data. The display device is configured to display video data. The video processing device is configured to receive the first video data from the video camera and to receive sound video data from one or more communication devices over, for example a network, to generate filtered versions of the first video data and optionally simultaneously display the filtered versions of the first video data on the display device, receive a selection for one of the filtered versions of the first video data, and transmit the selected filtered version of the first video data over the network to the one or more communication devices.

These and other implementations are described in detail below.

DETAILED DESCRIPTION

Figure 1:
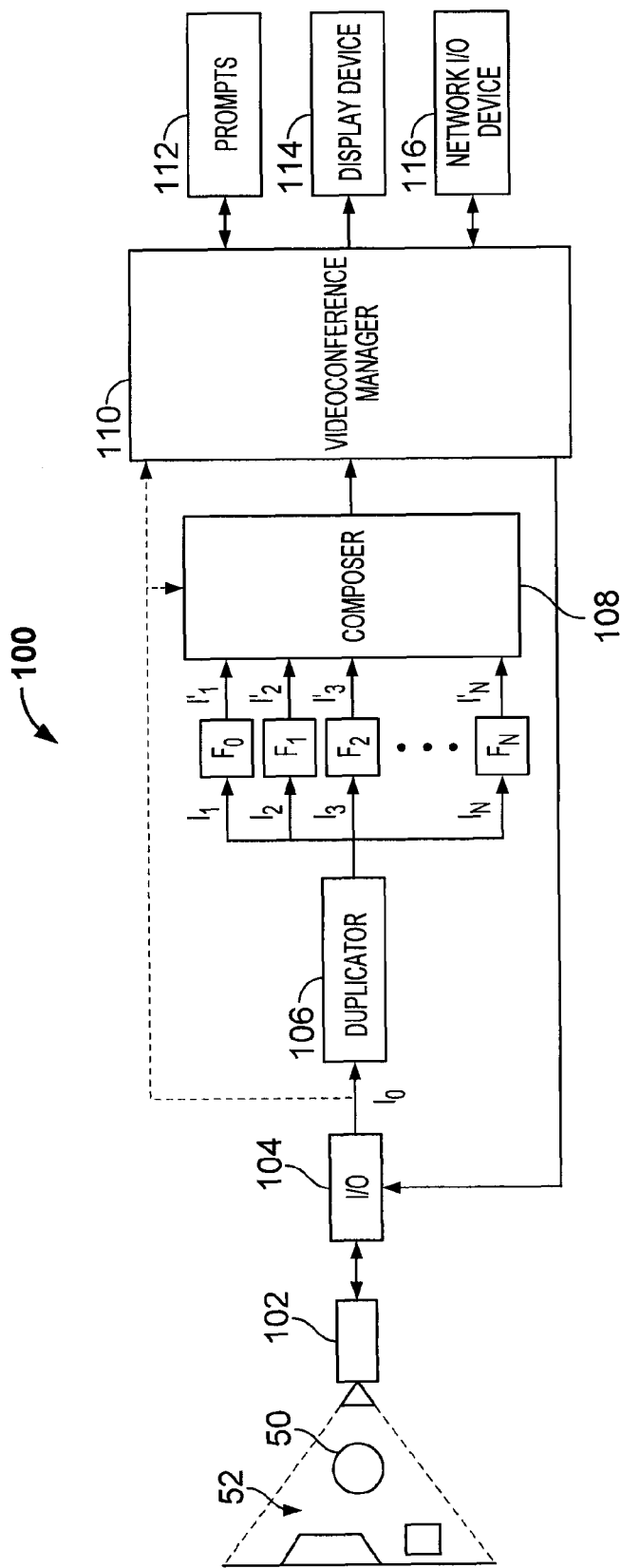
FIG. 1 is a block diagram of an example system for selecting and providing filtered video data for a videoconference.

FIG. 1 is a block diagram of an exemplary system 100 for selecting and providing filtered video data (e.g., video data) for a videoconference (e.g., a videoconference). Reference will be made to the exemplary system shown in FIG. 1 and methods associated therewith. By way of example, the filtered data described is video data. Other filtered data can be provided including filtered audio data or a combination of video and audio data. The system 100 can be used to receive a video input stream, filter the video input stream, display one or more filtered video streams for selection, and output the one or more selected filtered video streams to one or more other participants connected to a videoconference. The system 100 includes a video capture device 102, and I/O interface 104, a duplicator engine 106, filters $F_0, F_1, F_2 \ldots F_n$, a composer engine 108, a videoconference manager 110, a prompt interface 112, a display device 114, and a network I/O device 116.

The video capture device 102 (e.g., digital camera) can capture still images and/or live video and generate a video input stream of the still image or live video. The video capture device 102 can be wired or wireless, and can be integrated into a computer, game system, portable game system, portable media player, cellular telephone, portable music player (e.g., an iPod®, available from Apple Computer, Inc., Cupertino, Calif.), or other suitable device. In one implementation, the video capture device 102 is an Apple iSight Video Camera®, available from Apple Computer, Inc.

The video capture device 102 can be mounted on or located in proximity to a computer user's display device 114 so that a user 50, such as a videoconference participant in a participant environment 52, is in from of the video capture device 102. In other implementations, the video capture device 102 can be integrated into a handheld communication device.

The I/O interface 104 receives a video input stream containing compressed or uncompressed video data from a video source, such as the video capture device 102, and provides the received video data to the duplicator 106. Example I/O interfaces include Universal Serial Bus (USB) interfaces, FireWire interfaces, and the like.

The I/O interface 104 can also provide the video input stream $I_0$ to the videoconference manager 110. Video input stream $I_0$ can also be provided to the duplicator engine 106 in which, in one implementation, one or more copies of $I_0$ (i.e., $I_0, I_1, I_2 \ldots I_n$) are each individually provided to a corresponding filter (i.e., $F_0, F_1, F_2 \ldots F_n$). In one implementation, each filter operates on its respective video input stream by applying an effect to the video input stream to create filtered video input streams (i.e., $I'_0, I'_1, I'_2 \ldots I'_n$).

In one implementation, a filter can also apply a null effect, that is, the effect will not filter the video input stream so that the filter output is identical to the original video input stream. In another implementation, the video input stream may be provided directly to the videoconference manager 110 or composer 108 instead of implementing a null filter, as indicated by the dashed connector.

The filters may be stored in files in a data store on a computer system, allowing them to be shared among other systems and applications. In one implementation, each filtered video stream is stored in a corresponding stream file. The corresponding stream files may be provided as video input to other applications in addition to the videoconference manager 110.

Each modified video input stream $I'_0, I'_1, I'_2 \ldots I'_n$ is provided to the composer engine 108. The composer 108 prepares the modified video input stream for display in the videoconference manager 110, generating a preview of the various effects created by the filters. This may entail extracting image data from each modified video input stream and scaling each extracted image to fit in a presentation cell for display in a preview area, allowing the user to view the filtered video streams. An example preview area is described in more detail in reference to FIG. 6 below.

The videoconference manager 110 communicates with a network I/O device 116 to send and receive video data to and from participants of a videoconference. The videoconference manager 110 allows the user of the system 100 to view incoming video streams from other videoconference participants and an outgoing video stream, such as the video stream that includes video data from the video capture device 102. The outgoing video stream can include video data filtered by one or more of the filters $F_0, F_1, F_2 \ldots F_n$. Additionally, the incoming video streams can include video data that has been likewise filtered. The videoconference manager 110 provides video data to a display device 114 and receives information from the prompt interface 112 that is generated to receive user inputs. Example videoconference environments are described in more detail in reference to FIGS. 3 and 4 below.

The videoconference manager 110 generates user prompt interface 112 to receive user input and determines when a user has selected an effect to apply to the output video stream based on the user input. Once a user has selected an effect, the videoconference manager 110 transmits the filtered video stream to other participants connected to the videoconference. In one implementation, the selected filtered video stream is transmitted to all videoconference participants. In another implementation, user selections for one or more filtered video streams and one or more videoconference participants are received to associate selected filtered video streams with selected videoconference participants. The selected filtered video streams are then transmitted to the respectively associated videoconference participants.

The network I/O device 116 facilitates communications over a network, such as a local area network (LAN), a wide area network (WAN), or other wired and wireless networks. Example network I/O devices include wired and wireless Ethernet cards, and the like.

Figure 2:
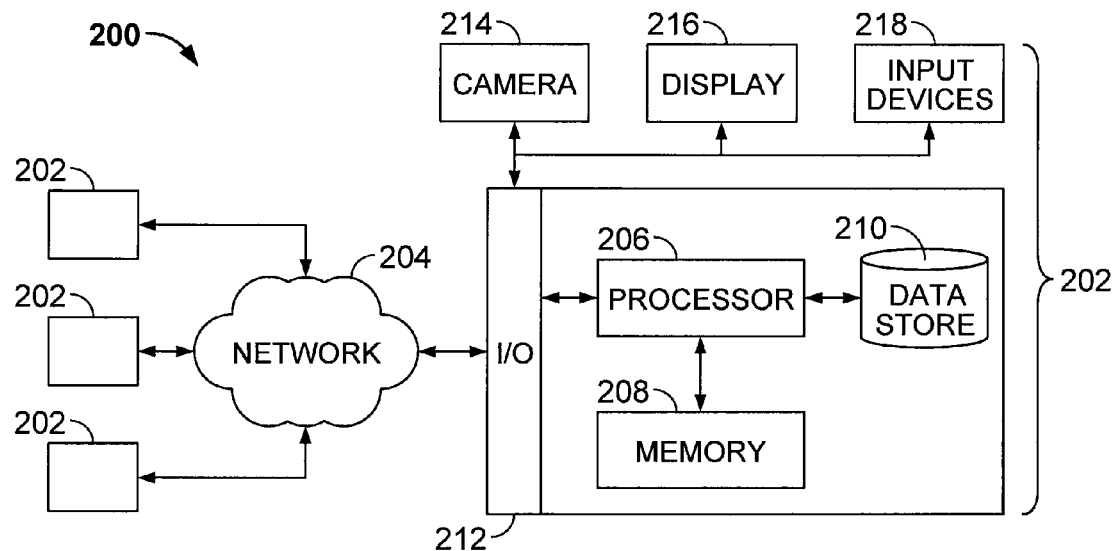
FIG. 2 is an example network environment in which the system of FIG. 1 may be implemented.

FIG. 2 is an example network environment 200 in which the system 100 of FIG. 1 may be implemented. The example network environment 200 includes one or more computing systems 202 connected to a network 204. Example networks 204 include LANs, WANs, and other wired and wireless networks. Each computing system 202 includes one or more processors 206, memory 208, a data store 210, and an I/O system 212. The I/O system 212 can be connected to a camera 214, a display 216, and input devices 218. By implementing the systems 100 in the computing systems 202, videoconference participants may send and receive both modified and unmodified video data over the network 204.

The processors 206 process incoming software and hardware requests and communicate with the memory 208, the data store 210, and the I/O system 212. Example processors include Complex Instruction Set Computers (CISC) and Reduced Instruction Set Computers (RISC), and the like. The processors 206 may also include Graphical Processing Units (GPUs) to facilitate the processing of image data and video data.

The memory 208 can provide storage for the processors 206 and can be used to facilitate the execution of instructions generated by software or hardware on the computer system 202. For example, the memory can be used to store a reference to a filter file, which can be used by the system to specify filter parameters.

The data store 210 can provide storage for the one or more processors 206 and can be used to store and retrieve information. For example, the data store 210 can store and retrieve a filter file or can store and retrieve data (e.g., video or images) from the videoconference. Example data stores 210 include hard drives, flash memory devices, dynamic random access memory devices, and the like.

The I/O system 212 facilitates communication between the network 204 and the computing system 202. The I/O system 212 can also facilitate communication between the processors 206 and other hardware devices attached to the computing systems 202, such as the camera 214, display 216, and input devices 218.

The camera 214 can capture video and image data for use in a videoconference. The camera can also capture audio from the videoconference, and can receive commands from the computing system 202. For example, the camera can receive commands that can modify the zoom of the camera or start and stop the camera recording.

The display 216 can be a cathode ray tube (CRT) device, liquid crystal display (LCD) device, and the like. The display 216 may also be touch sensitive to facilitate touch inputs, such as touch inputs generated by a stylus or a user's finger.

One or more input devices 218 can be used by the computing system 22 to enter commands. For example, the input devices 218 can be used to generate controls to select one or more video filters, to generate commands for the videoconference manager 110, or mute the sound on the capture device 102. Example input devices 218 include a keyboard, a mouse, a stylus, and the like.

Figure 3:
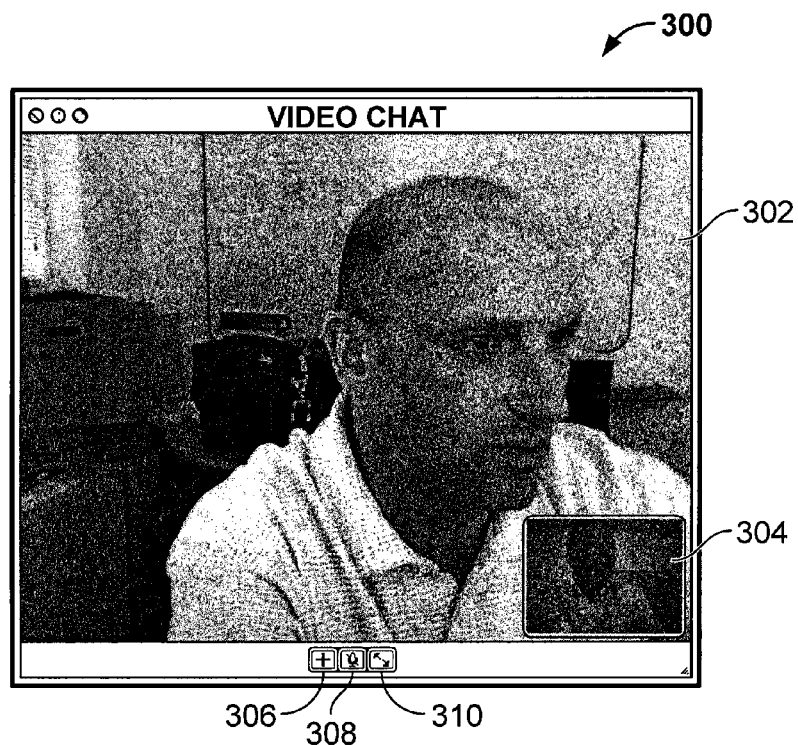
FIG. 3 is a video communication environment.

FIG. 3 is a video communication environment 300. The example video communication environment 300 illustrates a videoconference with two participants. The video communication environment 300 can be displayed by the display device 114 and managed by the videoconference manager 110. In one implementation, the environment 300 is subdivided into subsections. The received video is displayed in subsection 302, which shows the first participant, while the outgoing video is displayed in subsection 304, which shows the second participant. The example environment can be shown on the display device 114 of the second participant, and thus subsection 304 is subordinate to subsection 302, as the second participant is conferencing with the first participant shown in subsection 302. In this implementation, subordinate subsections are displayed in a picture-in-picture representation. The environment 300 also includes interfaces (e.g., user interface buttons), such as an add participant button 306, audio mute button 308, and full screen button 310.

Figure 4:
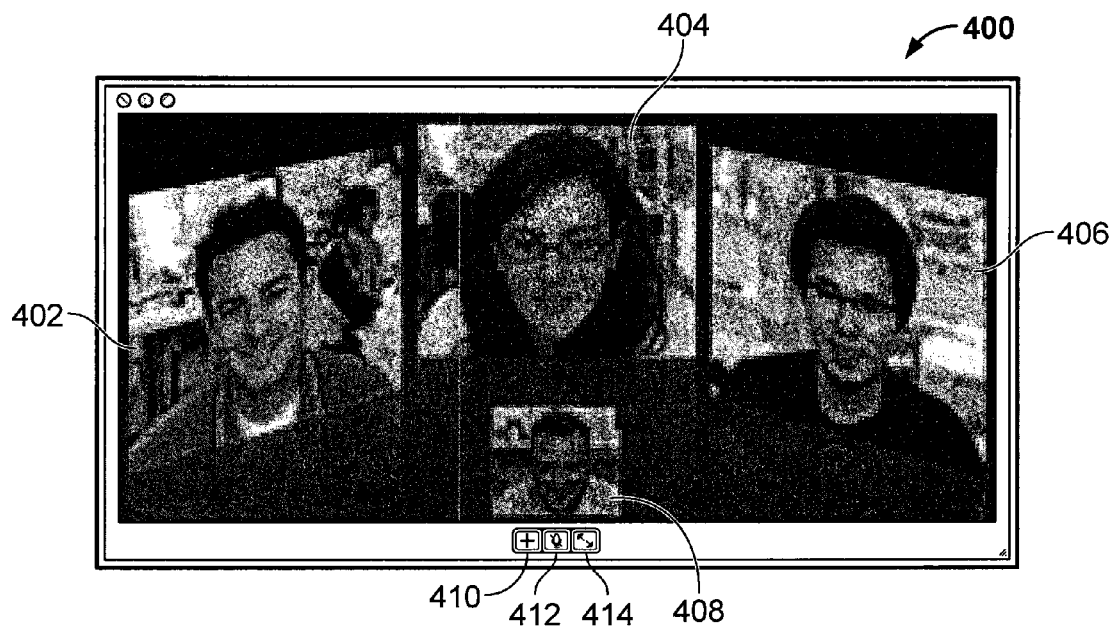
FIG. 4 is another video communication environment.

FIG. 4 is another video communication environment 400. The example video communication environment 400 illustrates a videoconference with more than two participants. The video communication environment 400 can be displayed by the display device 114 and managed by the videoconference manager 110. The received video streams are displayed in subsections 402, 404 and 406. The outgoing video is displayed in subsection 408, which is subordinate to subsections 402, 404 and 406. In this implementation, the subordinate subsection 408 is displayed in a smaller subsection that is juxtaposed to the subsections 402, 404 and 406. The environment 400 also includes an add participant button 410, an audio mute button 412, and full screen button 414.

The participants can select different filters for different outgoing video streams. For example, in FIG. 4, the participant displayed in subsection 408 can send filtered video data filtered by a selected filter $F_1$ to the participant in subsection 402, and send filtered video data by selected filter $F_2$ to the participant in subsection 404, and send unfiltered video data to the participant shown in subsection 406. Alternately, the participant displayed in subsection 408 can send the same filtered video data to all participants displayed in subsections 402, 404, and 406.

Figure 5:
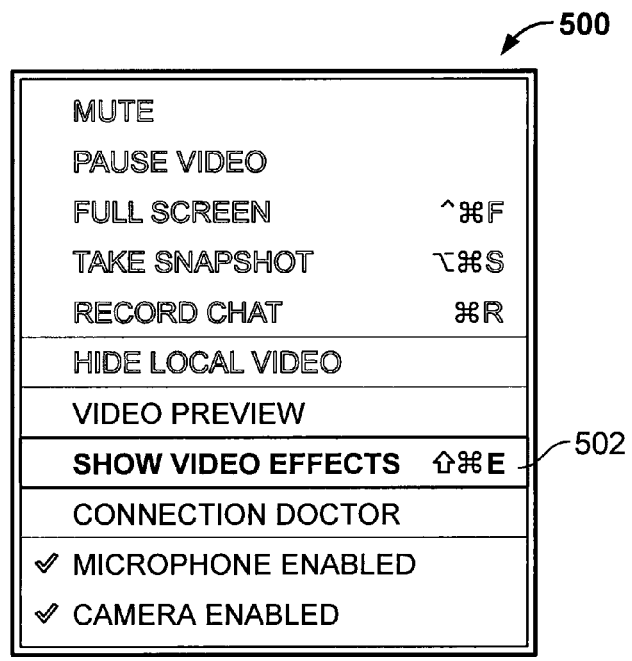
FIG. 5 is an example menu bar to invoke video effects for video data.

FIG. 5 is an example menu bar 500 to invoke video effects for video data. The participant of the videoconference can invoke the menu bar by using input device 218 as described in reference to FIG. 2. The menu bar can be invoked while the videoconference is ongoing or the menu bar can be invoked before the videoconference starts.

The menu bar can allow the participant to manage portions of the videoconference. For example, the menu bar can allow the participant to display the video effect filters that are available on the system 100. If the user selects "Show Video Effects" as shown by section 502, the system 100 can display a preview window of the available filters.

Figure 6:
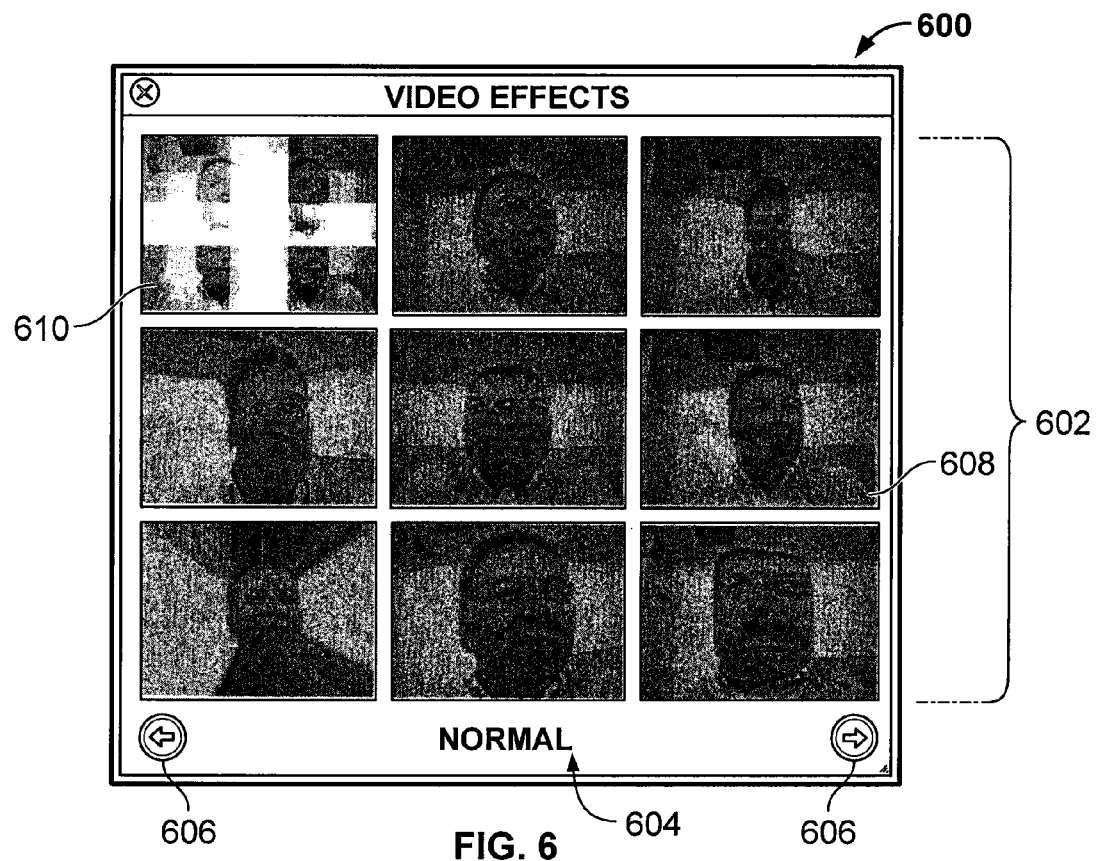
FIG. 6 is an example display of filtered video data.

FIG. 6 is an example display 600 of filtered video data. The display 600 can be used to show the filter video data. In one implementation, the display 600 arranges the various previews in a mosaic 602, e.g., a 3×3 video grid is used to simultaneously display nine filters.

The selected filter can be designated with a selection indicator. In one implementation, the border of the selected filter is highlighted by a border highlight 608. For example, the color of the border for the selected filter is highlighted by the border highlight 608.

The filter selection can also be identified by subsection 604 of the preview display. A null filter, for example, does not filter the video stream. In one implementation, the null filter is designated as the "Normal" filter, as illustrated in subsection 604.

The preview display 600 also includes navigation arrows 606. The navigation arrows 606 allow a participant of a videoconference to change the filtered video streams shown in the preview display 600. For example, a participant can use an input device (e.g., a mouse) to click on the left or right arrows 606 to change the filtered video streams.

The preview display 600 can include any number of filters. The number of filters can be determined by the number of files stored in the computing system 202 or can be predetermined by a configuration file used by the video conferencing system 100. In another example implementation, the preview display 600 may display only one filtered video stream at any one time.

In another implementation, the video filters can be selected from a drop-down menu. After selection from the drop down menu, the video filter can be applied to the video stream, and a preview of the filtered video stream is made available to the participant. If the participant accepts the previewed filtered video stream, then the filtered video stream is transmitted to other videoconference participants.

In another implementation, video filters can be selected from a drop-down menu and a preview pane showing the video stream of the participant's videoconference environment is adjacent the drop-down menu. For each selected video filter, the video stream in the preview pane is filtered accordingly. If the participant accepts the previewed filtered video stream, then the filtered video stream is transmitted to other videoconference participants.

Multiple video filters may be implemented. The example video data shown in FIG. 6 includes a silkscreen filter 610 and various distortion filters. Other filters can include sharpness filters, contrast filters, embossing filters, chalk filters, blur filters, and the like.

In one implementation, after the participant selects a filter, the videoconference manager 110 transmits the filtered video data to all videoconference participants. Thereafter, the filtered video data is also shown on the participant's subordinate display subsection.

In another implementation, after the participant selects a filter, the participant is promoted to select one or more other videoconference participants to receive the filtered video. Thereafter, the user may select additional filters and additional corresponding participants, or may instruct the videoconference manager 110 to begin transmitting the selected filtered video streams to the corresponding videoconference participants. Thereafter, when the participant selects a corresponding display of another videoconference participant, the corresponding filtered video stream received by the selected videoconference participant is displayed in the participant's subordinate display subsection.

Figure 7:
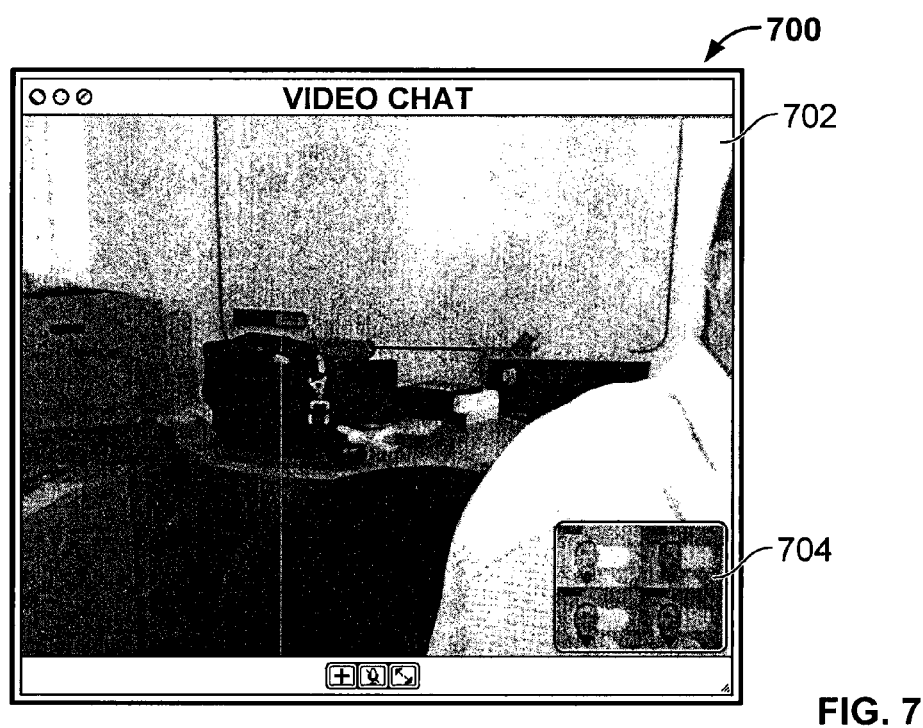
FIG. 7 is an example video communication environment of a videoconference participant that is transmitting filtered video data.

FIG. 7 is an example video communication environment 700 of a videoconference participant that is transmitting a filtered video data stream. In this example environment 700, the participant has selected a filter that modifies the outgoing video data stream into four different silkscreen-style portraits, as shown in subordinate subsection 704. Subsection 702 displays the video data stream received at the participant's videoconferencing device.

Figure 8:
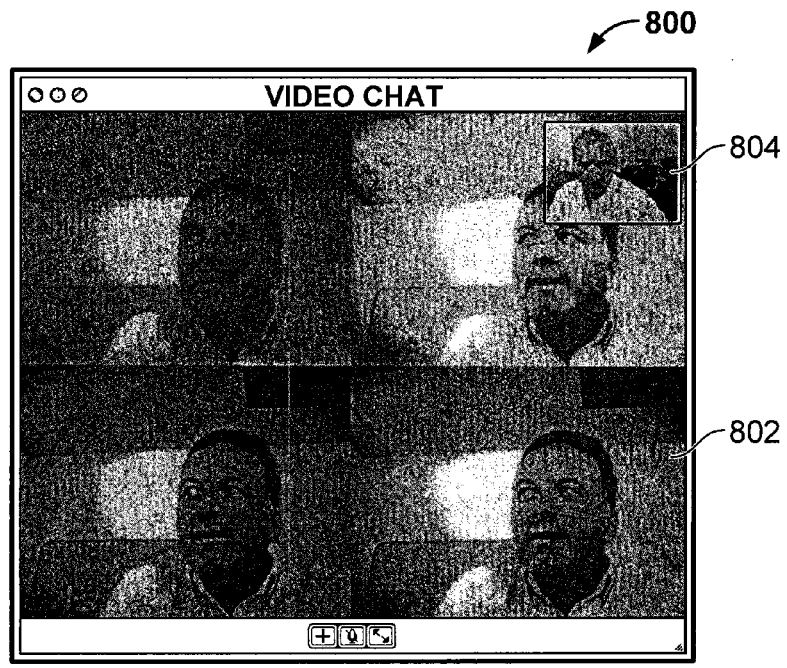
FIG. 8 is an example video communication environment of a videoconference participant that is receiving the filtered video data stream.

FIG. 8 is an example video communication environment 800 of a videoconference participant that is receiving the filtered video data stream described in FIG. 7. In this example environment 800, the videoconference participant, shown in the subsection 804, is shown viewing the filtered video data stream that is shown in subsection 802. The filtered video data shown stream in subsection 802 is the same filtered video data stream shown in subsection 704 of the video communication environment 700.

Figure 9:
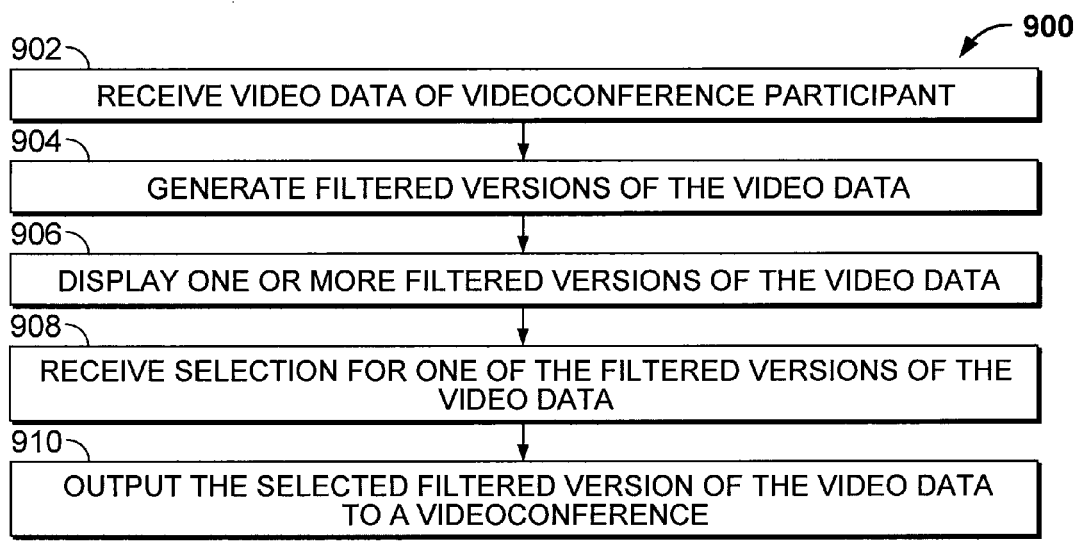
FIG. 9 is a flow diagram of an example process of providing filtered video data.

FIG. 9 is a flow diagram of an example process 900 of providing filtered video data. Stage 902 receives video data of a videoconference participant. The data can be captured, for example, by a video capture device 102 and received by the duplicator 106. The data may be compressed or uncompressed.

Stage 904 generates one or more filtered versions of the video data. For example, the system 100 can generate one or more filtered versions of the video data with filters $F_0$, $F_1$, $F_2 \ldots F_n$.

Stage 906 displays one or more filtered versions of the video data. In one implementation, the filtered versions are displayed in a mosaic. For example, the composer 108 and videoconference manager 110 may generate the display of the filtered versions of the video data. Alternatively, available filters can be displayed and selected from, and associated preview images displayed upon a selection of a particular filter as discussed above.

Stage 908 receives a selection for one of the filtered versions of the video data. For example, the videoconference manager 110 may receive a user input indicating a selection of a filter. Selected filters can be identified by various indicia, such as a different bounding box or a unique name.

Stage 910 outputs the selected filter version of the video data to one or more of the participants of the videoconference. For example, the video conference manager 110 may transmit the filtered video stream to all videoconference participants over the network device 116, or may transmit the filtered video stream to selected videoconference participants.

Figure 10:
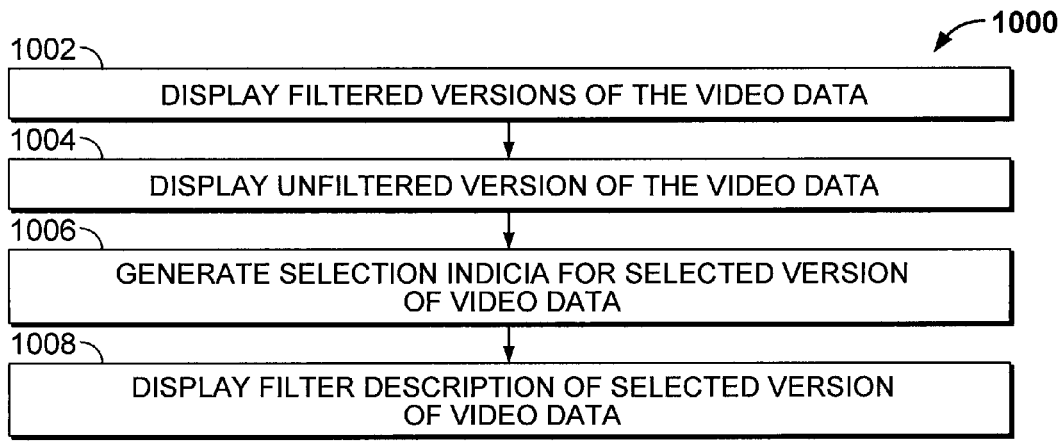
FIG. 10 is a flow diagram of an example process of simultaneously displaying filtered video data.

FIG. 10 is a flow diagram of an example process 1000 of simultaneously displaying filtered video data. Stage 1002 displays filtered versions of the video data. For example, the videoconference manager 110 may display the filtered version of the video data on the display device 114 in a mosaic format.

Stage 1004 displays unfiltered versions of the video data. For example, the video data can be unfiltered if the null filter is used, or if the participant has yet to select a modifying filter, or if the videoconference manager 110 receives an unfiltered video data stream from the I/O device 104.

Stage 1006 generates selection indicia for the selected version of the video data. For example, the videoconference manager 110 can change the color of the border of the video stream corresponding to the selected filter.

Stage 1008 displays a filter description for a selected version of the video data. In one implementation, a selected filter can have a different border and a textual description as selection indicia.

Figure 11:
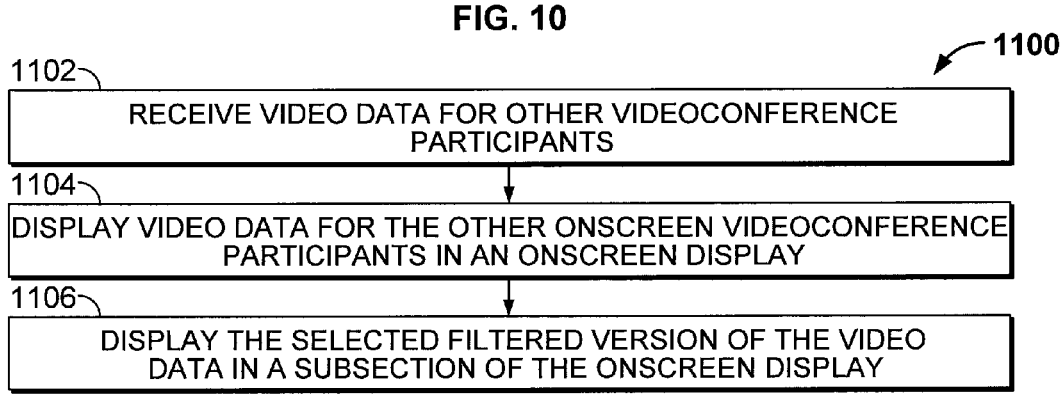
FIG. 11 is a flow diagram of an example process of receiving and displaying selected filtered video data.

FIG. 11 is a flow diagram of an example process 1100 of receiving and displaying selected filtered video data. Stage 1102 receives video data from other videoconference participants. The received video data can be filtered or unfiltered video data. For example, the network device 116 may receive video streams for other videoconference participants.

Stage 1104 displays video data for the other onscreen videoconference participants in an onscreen display. For example, the videoconference manager 110 may display the received video streams on the display device 114.

Stage 1106 displays the selected outgoing filtered version of the video display in a subsection of the onscreen display. The subsection on the onscreen display can be subordinate to the received data displayed on the onscreen display. In one implementation, the outgoing filtered version is subordinate to the received video as described in reference to FIG. 3. In another implementation, the outgoing filtered version is subordinate to the received video as described in reference to FIG. 4.

Figure 12:
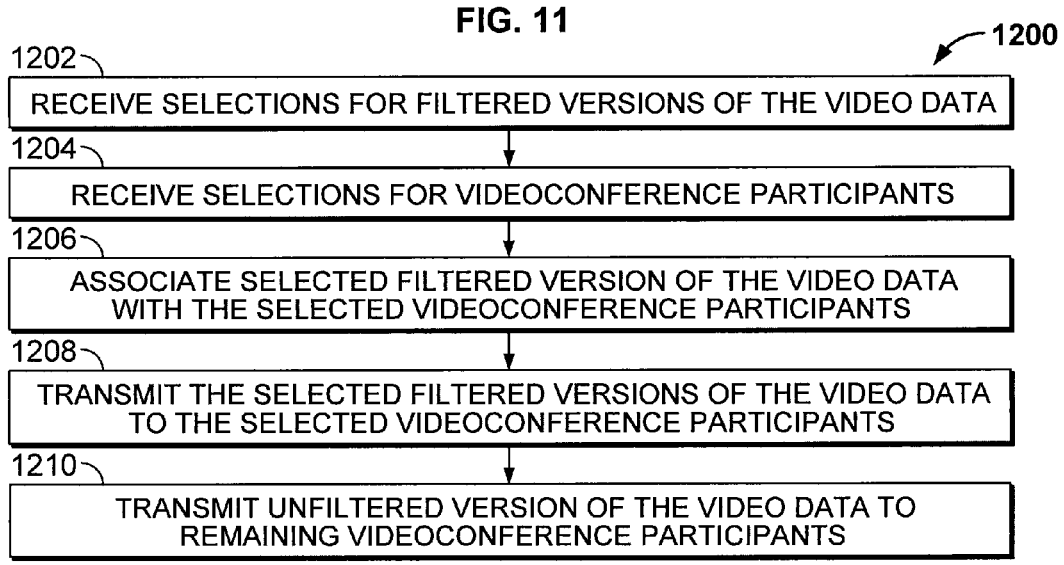
FIG. 12 is a flow diagram of an example process of providing multiple versions of filtered video data.

FIG. 12 is a flow diagram of an example process 1200 of providing multiple versions of filtered video data. Stage 1202 receives selection for filtered versions of the video data. For example, the participant can be prompted to select a filtered version by the videoconference manager 110.

Stage 1204 receives selections for videoconference participants. In one implementation, the sending participant can click another incoming participant's video displayed on the display device 114, such as the videoconference environment 400. In one implementation, the videoconference manager 110 interrupts the click as a selection.

Stage 1206 associates the selected filtered version of the video data with the selected videoconference participants. For example, the videoconference manger 110 can associate the selected filtered video data selected in stage 1202 with the selected videoconference participant(s) selected in stage 1204.

Stage 1208 transmits the selected filtered version of the video data to the selected videoconference participants. Stage 1210 transmits the unfiltered version of the video data to remaining videoconference participants that have not been selected.

Figure 13:
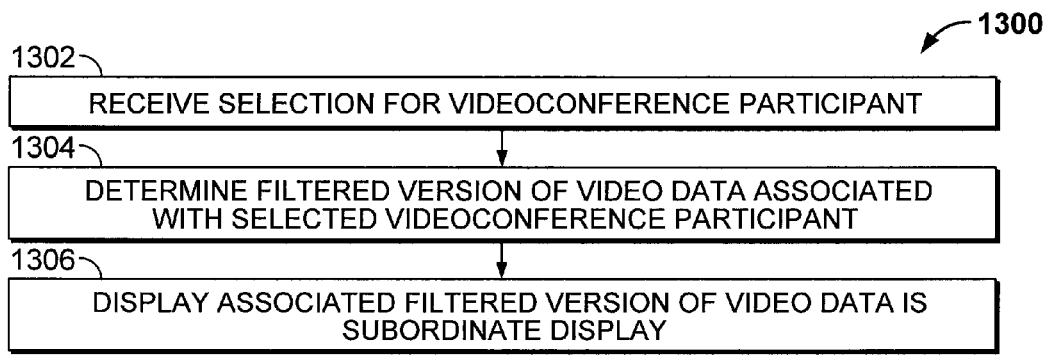
FIG. 13 is a flow diagram of an example process of displaying associated filtered versions of video data.

FIG. 13 is a flow diagram of an example process 1300 of displaying associated filtered versions of video data. The example process 1300 may be performed at a videoconference device associated with a sender of filtered video data. Stage 1302 receives a selection for a videoconference participant. For example, the sending participant can click another incoming participant's video displayed on the display device 114, such as in the videoconference environment 400, which will generate a selection signal to be received by the videoconference manager 110.

Stage 1304 determines the filtered version of the video data associated with the selected videoconference participant. The associations may be as described with reference to FIG. 12 above. Stage 1306 displays the associated filtered versions of the video data determined in stage 1302 in the subordinate display.

Figure 14:
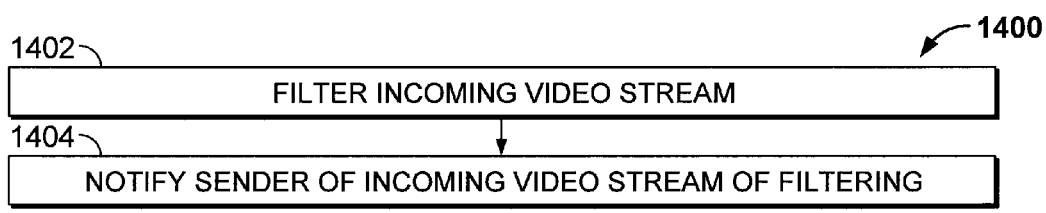
FIG. 14 is a flow diagram of an example process of filtering an incoming video stream.

While the example implementations above have been directed to filtering an outgoing video stream in a video conference, another different implementation provides a videoconference device the ability to filter incoming video streams. FIG. 14 is a flow diagram of an example process 1400 of filtering an incoming video stream. Stage 1402 filters the incoming video stream. For example, the videoconference manager 110 may use a selected filter to filter all incoming video streams, or filter selected incoming video streams.

Stage 1404 notifies the sender of the incoming video stream of the filtering for example, the videoconference manager 110 may filter of the incoming video stream shown in the subordinate display of the sender of the incoming video stream. In this example implementation, the videoconferencing device of the receiving participant that has selected to filter the incoming video stream transmits a filter identifier to the sender's videoconferencing device. Thereafter, the sender's videoconference device displays a filtered video stream in the sender's subordinate display, but continues to transmit an unfiltered video stream (or filtered video stream according to the sender's filtering selections) to other videoconferencing participants. A text note may appear next to the sender's subordinate display to inform the sender that the sender's outgoing video stream is being filtered by a videoconference recipient.

In another implementation, the filtering of the incoming video stream may be unbeknownst to the sender of the incoming video stream.

Figure 15:
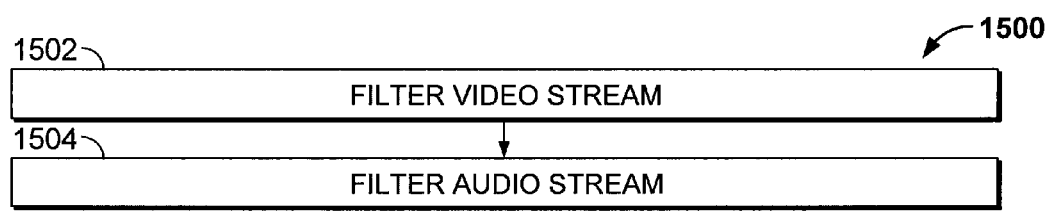
FIG. 15 is a flow diagram of an example process providing filtered video data and filtered audio data.

FIG. 15 is a flow diagram of an example process 1500 providing filtered video data and filtered audio data. In a different implementation, the filter systems and methods described herein may be applied to audio data. Audio effects such as echo, pitch, delay, equalization, filtering, and the like may be applied to an outgoing audio stream that accompanies the video stream.

Stage 1502 filters the outgoing video stream. For example, a participant may select a "silkscreen" style filter to filter an outgoing video stream as show in FIGS. 7 and 8 above.

Stage 1504 filters the outgoing audio stream. The audio filters may be process and selected by similar methods and systems as described above. For example, the participant may select a time delay audio filter to accompany the silkscreen style video stream of FIGS. 7 and 8 to provide the effect of multiple speakers.

Figure 16:
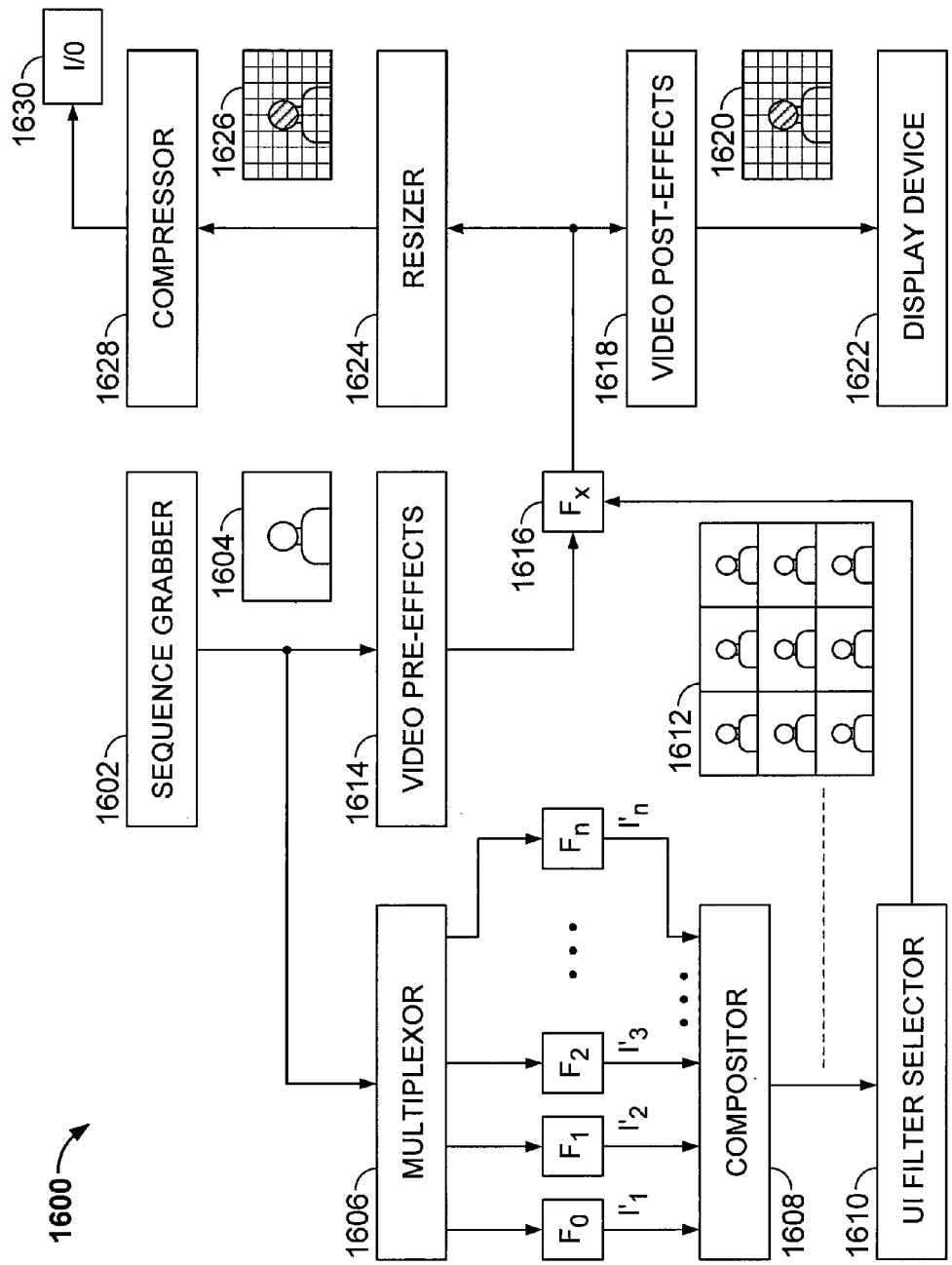
FIG. 16 is a block diagram of another example system for selecting and providing filtered video data for a videoconference.

FIG. 16 is a block diagram of another example system 1600 for selecting and providing filtered video data for a videoconference. The system 1600 can be used to receive a video input stream, filter the video input stream, display one or more filtered video streams for selection, and output the one or more selected filtered video streams to one or more other participants connected to a videoconference. The system 1600 includes a sequence grabber 1602, a multiplexer 1606, filters devices $F_0, F_1, F_2 \ldots F_n$, a compositor 1608, a user interface filter selector 1610, a video pre-effects processor 1614, a filter device $F_X$ 1616, a video post-effects processor 1618, a resizer 1624, a compressor 1628, and an I/O device 1630.

The sequence grabber 1602 receives an input video stream and processes the input video stream into source frames 1604. The source frames 1604 are provided in a first data path to the multiplexer 1606, which in turn provides the source frames to filter $F_0, F_1, F_2 \ldots F_n$. The compositor 1610 generates a composite video stream 1612, which is provided to the user interface filter selector 1610. The user interface filter selector 1610 interprets the sending user input e.g., mouse clicks, key strokes, and the like, and provides a filter selection signal to the filter device $F_X$ 1616.

The source frames 1604 are also provided in a second data path to a video pre-effects processor 1614. The pre-effects processor 1614 may provide one or more pre-effects, such as gamma correction, size correction, and the like. The filter device $F_X$ 1616 filters the source frames 1604 processed by the video pre-effects processor 1614 according to the filter selection signal provided by the user interface filter selector 1610.

The filter source frames 1604 are provided to a video post-effects processor 1618. The video post-effects processor 1618 can provide videoconference processing, such as PIP processing, camera preview processing, and the like. The final filtered frames 1620 for display in the sending user's subordinate display are then provided a display device 1622.

The filtered source frames 1604 are also provided to a resizer 1624. The resizer 1624 can, for example, resize the filtered source frames 1604 according to a desired aspect ratio. The aspect ratio may depend on a compression routine utilized by the compressor 1630. For example, if the compressor 1630 compresses the video according to the H.264 standard, then the filter frames 1604 may be resized into filter frames 1626 that have a 4:3 aspect ratio. Likewise, if the compressor 1630 compresses the video according to the H.263 standard, then the filter frames 1604 may be resized into filter frames 1626 that have an 11:9 aspect ratio.

The compressor provides the filtered frames to an I/O device 1630, which in turn processes the filtered and compressed video data for videoconference transmission over one or more networks.

In one implementation, the filter device $F_X$ 1616 may process the video frames 1604 according to one or more selected filtering effects and generate corresponding filtered video frames 1604. The corresponding filtered video frames 1604 may then be processed into separate video streams for reception by different videoconference participants.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
   receiving a first video input stream of a first participant environment for a videoconference;
   generating a plurality of duplicate instantiations of the first video input stream, each duplicate instantiation being a copy of the first video input stream;
   simultaneously filtering each of the duplicate instantiations of the first video input stream with a corresponding video effects filter, each video effects filter providing a different filtering effect from the other video effects filters and each video effects filter generating a respective filtered instantiation of the first video input stream;
   simultaneously displaying each of the filtered instantiations of the first video input stream;
   receiving a selection for one of the filtered instantiations of the first video input stream; and
   outputting the selected filtered instantiation of the first video input stream to the videoconference, the outputting comprising outputting the selected filtered instantiation of the first video input stream for display to a second participant in a second participant environment;
   receiving another selection for another one of the filtered instantiations of the first video input stream, the another selected filtered instantiation of the first video input stream being different from the selected filtered instantiation of the first video input stream;
   receiving a designation of a third participant in a third participant environment; and
   simultaneously outputting the another selected filtered instantiation of the first video input stream for display to the third participant in the third participant environment with the outputting of the selected filtered instantiation of the first video input stream for display to the second participant in the second participant environment.

2. The method of claim 1, further comprising:
   prompting the first participant to select one of the filtered instantiations of the first video input stream.

3. The method of claim 1, further comprising:
   simultaneously displaying an unfiltered duplicate instantiation of the first video input stream with the filtered instantiations of the first video input stream.

4. The method of claim 1, further comprising:
   receiving a filtered instantiation of a duplicate instantiation of a fourth video input stream of a fourth participant environment for the videoconference;
   displaying the filtered instantiation of the fourth video input stream in an onscreen display to a first participant in the first participant environment; and displaying the selected filtered instantiation of the first video input stream in a subsection of the onscreen display.

5. The method of claim 1, further comprising:
generating a fourth video input stream of a fourth participant environment for the videoconference;
generating a plurality of duplicate instantiations of the fourth video input stream, each duplicate instantiation being a copy of the fourth video input stream;
simultaneously filtering each of the duplicate instantiations of the fourth video input stream with a corresponding video effects filter, each video effects filter providing a different filtering effect from the other video effects filters and each video effects filter generating a respective filtered instantiation of the fourth video input stream;
simultaneously displaying each of the filtered instantiations of the fourth video input stream to a fourth participant in the fourth participant environment;
receiving a selection for one of the filtered instantiations of the fourth video input stream from the fourth participant;
receiving the selected filtered instantiation of the first video input stream; and
simultaneously displaying the selected filtered instantiation of the first video input stream in an onscreen display and the selected filtered instantiation of the fourth video input stream in a subsection of the onscreen display.

6. The method of claim 1, further comprising:
displaying the selected filtered instantiation of the first video input stream to one or more participants in the videoconference.

7. The method of claim 1, wherein:
simultaneously displaying the filtered instantiations of the first video input stream comprises displaying the filtered instantiations of the first video input stream in a mosaic format.

8. The method of claim 7, wherein:
displaying the filtered instantiations of the first video input stream in a mosaic format comprises displaying the filtered instantiations of the first video input stream in juxtapositions defining a grid.

9. The method of claim 1, wherein each of the video effects filters is a video distortion filter.

10. The method of claim 1, wherein generating a plurality of duplicate instantiations of the first video input stream comprises splitting the first video input stream.

11. A method, comprising:
receiving first video data of a first videoconference participant;
generating copies of the first video data;
filtering each copy of the first video data with a corresponding video effects filter, each video effects filter providing a different filtering effect from the other video effects filters and each video effects filter generating a respective filtered copy of the first video data;
simultaneously displaying each of the filtered copies of the first video data;
receiving a selection for one of the filtered copies of the first video data; and
outputting the selected filtered copy of the first video data to a videoconference, the outputting comprising outputting the selected filtered copy of the first video data for display to a second participant in a second participant environment;
receiving another selection for another one of the filtered copies of the first video data, the another selected filtered copy of the first video data being different from the selected filtered copy of the first video data;
receiving a designation of a third participant in a third participant environment; and
simultaneously outputting the another selected filtered copy of the first video data for display to the third participant in the third participant environment with the outputting of the selected filtered copy of the first video data for display to the second participant in the second participant environment.

12. The method of claim 11, further comprising:
prompting the first videoconference participant to select one of the filtered copies of the first video data.

13. The method of claim 11, further comprising:
simultaneously displaying an unfiltered copy of the first video data with the filtered copies of the first video data.

14. The method of claim 11, further comprising:
receiving second video data for the second videoconference participant;
displaying the second video data for the second videoconference participant in an onscreen display to the first videoconference participant; and
displaying the selected filtered copy of the first video data in a subsection of the onscreen display.

15. The method of claim 11, further comprising:
displaying the selected filtered copy of the first video data to a plurality of videoconference participants.

16. The method of claim 11, further comprising:
receiving audio data of a videoconference participant;
generating filtered copies of the audio data;
playing back the filtered copies of the audio data;
receiving a selection for one of the filtered copies of the audio data; and
outputting the selected filtered copy of the audio data to a video conference.

17. A system, comprising:
a video camera configured to generate first video data;
a display device configured to display the first video data; and
a video processing device configured to receive the first video data from the video camera and to receive second video data from one or more communication devices over a network, and further configured to generate copies of the first video data, filter each of the copies of the first video data with a corresponding video effects filter, each video effects filter providing a different filtering effect from the other video effects filters and each video effects filter generating a respective filtered copy of the first video data, simultaneously display each of the filtered copies of the first video data on the display device, receive a first selection for first filtered copy first video data from the filtered copies of the first video data, receive a second selection for a second filtered copy of the first video data, the second filtered copy of the first video data being different from the first filtered copy of the first video data, transmit the first filtered copy of the first video data over the network to the one or more first communication devices, and simultaneously transmit the second filtered copy of the first video data over the network to one or more second communication devices that are different from the one or more first communication devices with the first filtered copy of the first video data to the one or more first communication devices.

18. The system of claim 17, wherein:
the video processing device is configured to prompt a user that is the subject of the first video data to select one of the filtered copies of the first video data.

19. The system of claim 18, wherein:

the video processing device is further configured to display the second video data in an onscreen display environment, and display the first filtered copy of the first video data in a subsection of the onscreen display environment.

20. The system of claim 19, wherein:

the subsection of the onscreen display environment in which the first filtered copy of the first video data is displayed is subordinate to subsections of the onscreen display environment in which the second video data are displayed.

21. The system of claim 17, wherein:

the video process device comprises a personal computer.

22. The system of claim 21, further comprising:

a data store storing filters configured to filter the copies of the first video data.

23. A system, comprising:

means for generating duplicate instantiations of a video input stream of a first video conference environment of a videoconference;

means for filtering each of the duplicate instantiations of a video input stream with a corresponding video effects filter, each video effects filter providing a different filtering effect from the other video effects filters and each video effects filter generating a respective filtered instantiation of the first video input stream;

means for simultaneously displaying the filtered instantiations of the video input stream;

means for receiving a selection for first filtered instantiations of the video input stream and a selection of a second filter instantiation of the video input stream, the first filtered instantiation being different from the second filtered instantiation;

means for associated the first filtered instantiation with a first display device in a second video conference environment of the videoconference;

means for associated the second filtered instantiation with a second display device in a third video conference environment of the videoconference; and means for simultaneously outputting the selected first and second filtered instantiations of the video input stream to the respective first and second display devices in the second and third videoconference environments of the videoconference.

* * * * *

UNITED STATES PATENT AND TRADEMARK OFFICE
CERTIFICATE OF CORRECTION

| | | |
|---|---|---|
| PATENT NO. | : 7,839,434 B2 | |
| APPLICATION NO. | : 11/537217 | |
| DATED | : November 23, 2010 | |
| INVENTOR(S) | : Jean-Pierre Ciudad et al. | |

It is certified that error appears in the above-identified patent and that said Letters Patent is hereby corrected as shown below:

Title Pg, Item (56), under "U.S. Patent Documents", in column 2, line 18, under Washington delete "348/14.08" and insert -- 348/14.01 --, therefor.

In column 1, line 5, delete "one" and insert -- on --, therefor.

In column 1, line 47, delete "sound" and insert -- second --, therefor.

In column 2, line 41, delete "and" and insert -- an --, therefor.

In column 2, line 59, delete "from" and insert -- front --, therefor.

In column 4, line 23, delete "computer" and insert -- computing --, therefor.

In column 4, line 38, delete "systems" and insert -- system --, therefor.

In column 4, line 51, delete "22" and insert -- 202 --, therefor.

In column 6, line 20, delete "silkscreen" and insert -- silkscreen-style --, therefor.

In column 6, line 30, delete "promoted" and insert -- prompted --, therefor.

In column 7, line 61, delete "selection" and insert -- selections --, therefor.

In column 7, line 67, after "as" insert -- in --.

In column 8, line 2, delete "interrupts" and insert -- interprets --, therefor.

In column 8, line 5, delete "manger" and insert -- manager --, therefor.

Signed and Sealed this
Eighth Day of November, 2011

David J. Kappos
*Director of the United States Patent and Trademark Office*

CERTIFICATE OF CORRECTION (continued)
U.S. Pat. No. 7,839,434 B2

In column 8, line 40, delete "filtering for" and insert -- filtering. For --, therefor.

In column 9, line 24, delete "filter" and insert -- filters --, therefor.

In column 9, line 27, delete "input" and insert -- input, --, therefor.

In column 9, line 38, delete "filter" and insert -- filtered --, therefor.